Nov. 3, 1970  J. J. PETERS ET AL  3,537,862
PROCESS FOR PREPARING AN ALIMENTARY PASTE PRODUCT
Filed Feb. 1, 1967
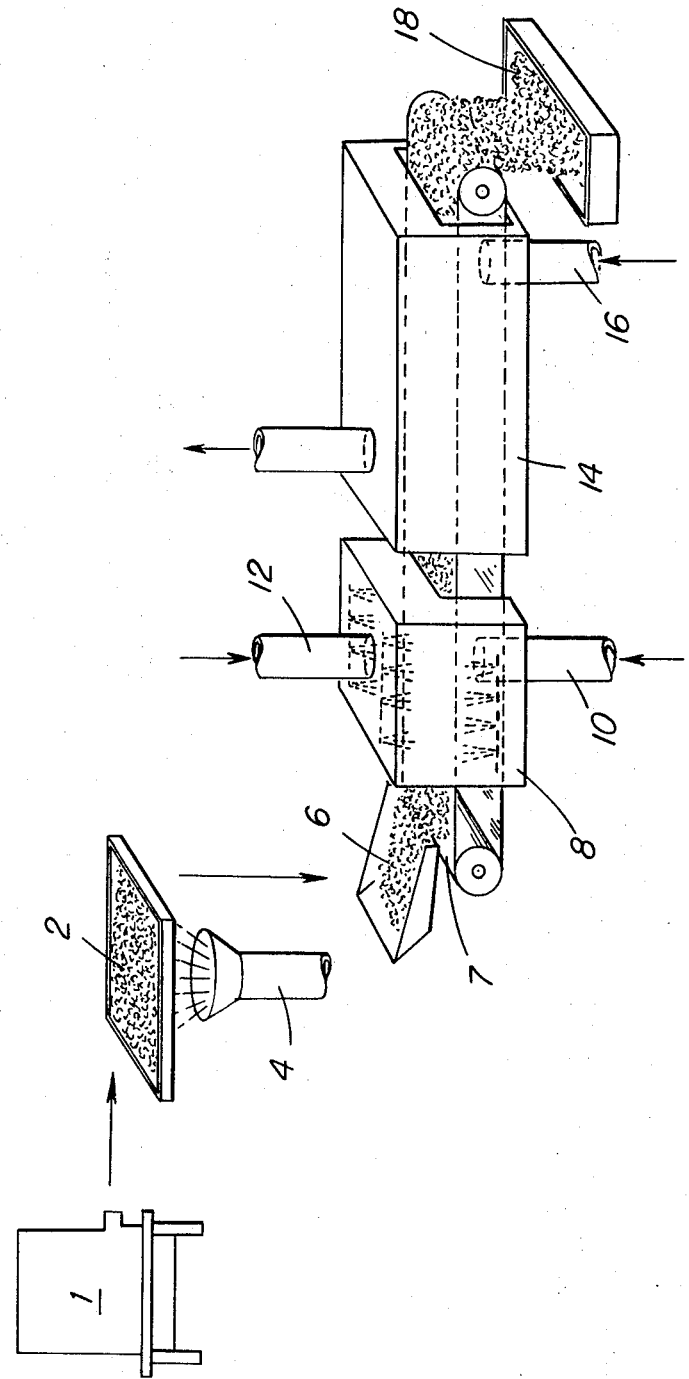

3,537,862
PROCESS FOR PREPARING AN ALIMENTARY PASTE PRODUCT
Joseph J. Peters and Abraham R. Mishkin, Marysville, Ohio, assignors to Societe d'Assistance Technique pour Produits Nestle S.A., Lausanne, Switzerland, a corporation of Switzerland
Filed Feb. 1, 1967, Ser. No. 613,319
Int. Cl. A23l 1/16
U.S. Cl. 99—85                                            7 Claims

ABSTRACT OF THE DISCLOSURE

A process is provided for cooking shaped alimentary paste such as noodles, macaroni, etc. having a maximum wall thickness of 0.63 mm., by contacting the paste with steam. During such contact the paste is maintained in a moist condition. After cooking is completed the paste is dried.

---

This invention relates to alimentary paste products, such as macaroni, noodles and the like, which can be prepared for consumption in markedly reduced time, and to process for their preparation.

Alimentary paste products are conventionally prepared from flour such as semolina, durum or other hard wheat, and water. The dough, which may contain additional ingredients, such as egg, is extruded or otherwise formed into appropriate shapes, which are then dried, preferably under conditions which prevent or minimize cracking or checking of the products. To prepare conventional paste products of this type for consumption requires twelve or more minutes of cooking in a considerable excess of vigorously boiling water. Following cooking, a rinsing step is commonly employed to remove the sticky, gelatinized starch from the surfaces of the cooked paste.

There have been a variety of proposals in the prior art to modify paste products and the method by which they are made. One proposal has been to gelatinize a slurry of 60–85% water and the balance flour, then prepare shaped articles from the resultant gel, and dry the articles.

Another proposal has been to modify the composition of the paste by inclusion of a proteinaceous material such as soy bean flour and to extrude the paste in grain form. The grains are then treated in a specific manner to impart a porous structure.

Another suggestion has been to incorporate in paste products a leavening agent such as baking powder or yeast, to create a plurality of minute voids distributed throughout the body of the product and thereby reduce the time needed for cooking.

It has also been suggested to provide spaghetti or macaroni products with thin wall sections as compared to the relatively thick wall sections of conventional practice. A significant drawback of this proposal is that the thin-wall products have markedly less integral strength and tend to collapse upon cooking in boiling water, yielding a compacted, unevenly cooked mass which interferes with distribution of the cooking medium, juices, seasoning, etc. through the interior of the product.

By contrast, the process of this invention provides a product which can be rapidly prepared for consumption and which also simplifies the necessary preparative steps. Thus the product of this invention is prepared simply by combining the paste product with a pre-measured amount of hot water and permitting the mixture to stand for a relatively brief period of time.

The process of the invention, which is more fully described below, entails cooking the shaped paste articles in a specific manner, the duration of cooking being such that the paste is substantially completely cooked. Preparation of the cooked paste for consumption essentially entails rehydration.

The time required for reconstitution may vary by a minute or two depending upon the wall thickness and shape of the paste articles, and is increased if a dehydrated sauce (together with the necessary additional water) is included. Thicker walls or more complex shapes may require slightly longer time, while very thin walls may require slightly less time. Since only a pre-measured amount of water is employed, however, excessive hydration is avoided. Rinsing to remove starch and draining of boiling water from the product are obviated, as are the time and thermal energy required to heat the large excess of water conventionally employed.

An important feature of the present invention is that the wall thickness of the shaped paste is below about 0.63 mm., preferably between about 0.46 and 0.63 mm., a wall thickness between about 0.50 and 0.56 mm. being particularly preferred. Thicknesses below about 0.30 mm. are generally unsatisfactory.

As heretofore noted, cooking of paste articles having wall thicknesses substantially less than the conventional (conventional thickness being 1 mm. or more) presents difficulties, including a tendency of the articles to collapse when cooked in boiling water. Employment of steam as the cooking medium also has substantial disadvantages, including a deleterious effect on the articles.

It has been discovered that the shape and integrity of shaped paste having wall thicknesses below about 0.63 mm. can be preserved by employing the process of this invention. In accordance with that process, the shaped paste articles are cooked by contact with steam, while simultaneously maintaining the articles in a moist condition. It is not completely understood by what mechanism the simultaneous treatment with steam and moisture accomplishes the desired result, but it is important that the paste be maintained in a moist condition throughout the cooking period. A hot water spray has been found suitable for this purpose. Continued or intermittent contacting of the articles with moisture may be employed, so long as they are maintained moist.

Thus the process of this invention comprises substantially completely cooking shaped alimentary paste having a wall thickness below about 0.63 mm., preferably as a noodle or in tubular, elbow, shell or other hollow form, with steam while simultaneously maintaining the shaped paste in a moist condition, and thereafter drying the paste.

The cooked product can be dried in any convenient manner to a suitable moisture content and drying can be carried out in either a batch or in a continuous process. It is prefered that the drying temperature not exceed 115° C.

The features of the present invention are described below in greater detail with particular reference to macaroni, it being understood that the process of the present invention is applicable to paste products generally.

Preparation of the dough and of the shaped paste can be accomplished employing conventional compositions, apparatus and methods. A suitable dough for macaroni can be prepared, for example, from 65–85% by weight flour, the balance water and such seasonings and condiments as may be desired. Any wheat flour, suitably farina, fancy durum patent flour, or the like can be used. There is no need to modify the dough by inclusion of other than the conventional wheat flour. The dough can optionally be rested before or after shaping of the paste product. Resting enhances the preferred golden coloration of the product, and can also improve uniformity of moisture distribution and contribute to the firmness of the paste as well as improve its ability to resist collapse during cooking.

Shaping of the dough is conventional, and is commonly accomplished by extrusion. The shaped paste can be dried before cooking to impart strength and facilitate handling and preservation of shape. The shaped paste can suitably be dried to a moisture content of about 16–28%, preferably about 20–25%. Too rapid drying of the product is to be avoided, as is localized drying, either of which can adversely affect appearance.

The macaroni is coked by contact with steam while maintaining the macaroni moist, most conveniently by spraying with hot water. The water temperature should not be so low as to interfere with cooking, and is suitably between about 77° C. and about 99° C., preferably between 88° C. and 93° C. The temperature of the steam and its flow rate desirably maintain the cooking zone at a temperature of at least about 100° C.

Cooking is most conveniently carried out as a continuous process, employing a foraminous support for the paste, such as a moving screen or belt. In the operation of a continuous moving belt system, steam may be introduced from below to pass through the belt, while water is sprayed from above onto the product. The rate at which water is sprayed or otherwise applied to the surface of the paste is determined in part by steam temperature, wall thickness and configuration of the paste, the extent to which paste is loaded on the belt and other factors apparent to those skilled in the art. Generally, it is sufficient to supply hot water to the articles on the belt at a rate at least about 1.5–2.5 liters per minute per kilogram of paste. A steam rate of at least about 0.5–2.5 kilograms per minute per kilogram of paste is suitable for low pressure steam at a temperature slightly above 100° C., lesser rates being suitable for steam of higher temperature. It is preferred that the paste be distributed on the belt in a single layer, preferably with the individual articles not touching. Agitation or vibration means to cause the articles to turn or move while on the belt may optionally be employed.

Cooking is completed in about 4 to 10 minutes. The extent of cooking of the shaped dough in the process of this invention is to a limited degree a matter of choice, depending upon the "bite" and related characteristics desired, and is influenced by the particular conditions selected, as well as by the wall thickness and configuration of the paste articles. A cooking time of about four to about ten minutes is generally adequate, 5–6 minutes being generally suitable for paste having the particularly preferred wall thickness of 0.50–0.56 mm. Completion of cooking can be ascertained by a simple taste test; when the paste ceases to be mealy and doughy, cooking is completed. Steam and water temperatures and rates can also influence cooking time, and the degree to which it is described that the paste be cooked is also a factor.

If desired, the water spray can be continued in a batch process after the steam is shut off, or in a continuous process in a zone remote or removed from the entering steam. Such an arrangement may be employed to rinse solids from the surface of the product, if necessary or desirable, or to regulate cooking time, but employment of the preferred water spray generally obviates the need for rinsing. In accordance with a preferred embodiment of the process, the cooked product is sprayed with or immersed in a batch of cold water to stop cooking and to make the product firmer, lessening the tendency of the individual pieces to stick together.

The cooked paste is then drained and dried. Drying can be accomplished in any suitable manner. When a batch process is used, a fluidized bed dryer is particularly useful to remove the greatest part of the water from the paste. Most preferably continuous drying is employed, such as on a conveyor belt moving through a drying tunnel. In all stages of drying the temperature is preferably kept below 115° C. to avoid possible damage to the product. The product is desirably dried to a moisture content of less than about 13%, preferably less than about 10% by weight.

Reconstitution of the product of the invention can be accomplished by various procedures. According to one procedure the paste product is added to a pre-measured amount of cold water. The mixture is brought to a boil and is removed from the source of heat. Depending on the wall thickness of the paste, rehydration for consumption is complete within about 1–2 minutes from the time it was removed from the heat. According to another method, the paste is added to a pre-measured amount of boiling water, the container is removed from the source of heat; reconstitution is complete in about 2–4 minutes. If a dried sauce is to be reconstituted together with the paste, the above-mentioned time periods may require about 1–3 additional minutes for completion of the rehydration. The paste product of the present invention can also be reconstituted with or without a sauce by placing it into a casserole with a pre-measured amount of water required for hydration and placing the casserole into a heated oven for a suitable length of time.

While the paste product of the present invention can be reconstituted in amounts of water which are in excess of that needed for rehydration, it is greatly preferred to employ only the amount of water required for hydration. Where a dehydrated sauce is not included, 240–300 cc. of water per 100 grams of dried, cooked paste product is suitable.

Any desired sauce can be used with the paste product, and dried or dehydrated sauces can be packaged mixed with or separately from the product when preparation of a complete dish is desired to be facilitated. Suitable dried sauces will be apparent to those skilled in the art and include cheese, amandine, beef and onions, dehydrated peppers, herbs, as well as a wide variety of condiments and flavorings.

A schematic representation of the process of the present invention is shown in an illustrative embodiment in the drawing. An alimentary paste is extruded in a conventional extruder 1, to form shaped articles 2. The extruded paste has the wall thickness hereinabove defined. The extruded articles may be briefly dried, as by a stream of ambient air from a blower 4. The articles are fed to a hopper 6, from which they are distributed onto a foraminous conveyor belt 7, which carries them into a cooking chamber 8. Steam is injected at 10 through the bottom through jets or other distributing means (not shown) if desired, while water is introduced at 12 through suitable spray nozzles at the top of the cooking chamber. The cooked paste is then carried by the belt into a drying zone 14, into which hot air is introduced at 16, exiting at 17. The dried paste 18, which may be subjected to further drying, if necessary, is collected at the end of the belt.

The following example is intended to be illustrative and is not to be taken in a limiting sense. All parts and percentages referred to in this specification are by weight, unless otherwise indicated.

EXAMPLE 5.125 parts of fancy durum patent flour at 22° C. and containing 14.6% moisture are thoroughly mixed with 1.375 parts of water having a temperature of 82–93° C., for a period of about 10 minutes. The resultant dough is extruded in a macaroni press through a die heated to 60–63° C. The elbows produced are 1.27 cm. long, have an outside diameter of 0.51 cm. and a wall thickness of 0.5 mm.

The shaped elbows are transferred from the extruder to a moving-screen conveyor and carried into a cooking chamber. Low pressure steam at a temperature of 100–110° C. and at a rate of 2.5 kg. steam per kg. paste per minute is injected into the cooking chamber and passes through the belt to contact the elbows. Simultaneously, water at a temperature of 88–93° C. is sprayed onto the elbows at a rate of about 2.4 liters per minute per kg. of paste. After 7 minutes the elbows are carried out of the cooking chamber and immersed in a bath of cold water having a temperature of about 18° C.

The elbows are then drained and carried by the conveyor belt through a tunnel drier where they are dried to a final moisture content of 8% employing air at a temperature of 110° C.

The dried product is reconstituted by adding 100 grams of the product to 250 cc. boiling water. The cooking vessel is thereupon removed from the source of heat, and after a three minute period the paste is completely reconstituted for consumption.

When a dehydrated sauce is mixed with the paste, the water ratio is increased by the amount of water required for the rehydration of the sauce, and about a 5 minute period is required until complete reconstitution is achieved.

We claim:

1. Process for preparing an alimentary paste product which retains its shape and integrity after cooking, which comprises substantially completely cooking a shaped alimentary paste having a wall thickness below about 0.63 mm. by contact with steam while simultaneously maintaining the shaped paste in a moist condition throughout the cooking period by intermittently or continuously spraying hot water thereon, and thereafter drying the paste to a moisture level of below above 13%.

2. Process according to claim 1, wherein the wall thickness of the paste is between about 0.46 mm. and about 0.63 mm.

3. Process according to claim 1, wherein the surface of the shaped paste is maintained in moist condition by spraying water at a temperature between about 77° C. and 99° C. onto the paste.

4. Process according to claim 3, characterized in that the sprayed water is at a temperature between about 88° C. and 93° C.

5. Process according to claim 4, wherein the wall thickness of the paste is between about 0.5 mm. and about 0.56 mm.

6. Process according to claim 3, characterized in that the water is sprayed at a rate of at least about 1.5 liters per kg. of paste per minute.

7. Process for preparing an alimentary paste product which retains its shape and integrity after cooking, which comprises substantially completely cooking macaroni having a wall thickness between about 0.46 mm. and about 0.63 mm. by simultaneous contact with steam at the rate of at least 1.5 kg. steam per kg. paste per minute and with water of a temperature between about 76° C. and 99° C. sprayed onto the paste at a rate of at least about 1.5 liters per kg. of macaroni per minute, terminating cooking by immersing the cooked macaroni in cold water, and drying the macaroni at a temperature below 115° C. to a moisture content not in excess of 12% by weight.

References Cited
UNITED STATES PATENTS

| | | | |
|---|---|---|---|
| 2,615,809 | 10/1952 | Jean | 99—85 |
| 3,172,765 | 3/1965 | Carloni | 99—85 |
| 3,318,707 | 5/1967 | Ernst | 99—85 |
| 3,352,686 | 11/1967 | Mancuso et al. | 99—85 |

OTHER REFERENCES

Hummel "Macaroni Products" 1966, pp. 1, 2, 5. Food Trade Press, Ltd., London.

RAYMOND N. JONES, Primary Examiner

PO-1050
(5/69)

UNITED STATES PATENT OFFICE
CERTIFICATE OF CORRECTION

Patent No. 3,537,862            Dated November 3, 1970

Inventor(s) J. J. Peters et al

It is certified that error appears in the above-identified patent and that said Letters Patent are hereby corrected as shown below:

Column 3, line 53, "described" should read --desired--.
Column 3, line 63, "batch" should read --bath--.
Claim 1, last line, "above" should read --about--.

Signed and sealed this 15th day of June 1971.

(SEAL)
Attest:

EDWARD M. FLETCHER, JR.
Attesting Officer

WILLIAM E. SCHUYLER, JR.
Commissioner of Patents